US012637301B2

(12) United States Patent　　　(10) Patent No.:　US 12,637,301 B2

Hohl　　　　　　　　　　　　　(45) Date of Patent:　　May 26, 2026

(54) SUSPENDED CONVEYOR

(71) Applicant: FERAG AG, Hinwil (CH)

(72) Inventor: Urs Hohl, Siebnen (CH)

(73) Assignee: FERAG AG, Hinwil (CH)

( * ) Notice:　Subject to any disclaimer, the term of this patent is extended or adjusted under 35 U.S.C. 154(b) by 157 days.

(21) Appl. No.: 18/442,692

(22) Filed:　Feb. 15, 2024

(65)　　　　Prior Publication Data

US 2024/0279002 A1　Aug. 22, 2024

(51) Int. Cl.
| | |
|---|---|
| *B65G 47/36* | (2006.01) |
| *B65G 19/02* | (2006.01) |
| *B65G 47/60* | (2006.01) |
| *B65G 47/61* | (2006.01) |

(52) U.S. Cl.
CPC ........... *B65G 47/36* (2013.01); *B65G 19/025* (2013.01)

(58) Field of Classification Search
CPC ........ B65G 47/36; B65G 47/60; B65G 47/61; B65G 19/025
USPC ........................................................ 198/680
See application file for complete search history.

(56)　　　　References Cited

U.S. PATENT DOCUMENTS

| | | | |
|---|---|---|---|
| 2,752,883 A | 7/1956 | Curtis | |
| 2,940,400 A | 6/1960 | Harrison | |
| 3,124,236 A * | 3/1964 | Gerisch ................ | B65G 47/482 |
| | | | 198/360 |

| | | | |
|---|---|---|---|
| 3,247,952 A * | 4/1966 | Kozlosky ............... | B65G 47/61 |
| | | | 198/465.4 |
| 3,454,148 A * | 7/1969 | Harrison ................ | B65G 47/61 |
| | | | 198/465.4 |
| 4,287,829 A | 9/1981 | Wakabayashi | |

(Continued)

FOREIGN PATENT DOCUMENTS

| | | |
|---|---|---|
| DE | 1 290 491 B | 3/1969 |
| DE | 41 18 106 C1 | 6/1992 |

(Continued)

OTHER PUBLICATIONS

EPO (Munchen, DE), Form No. 1507N, Communication and Form No. 1503 03.82, Ext. European Search Report for European Patent Appln. No. EP 24157723.8, dated Jul. 4, 2024 (8pp.).

(Continued)

*Primary Examiner* — Douglas A Hess
(74) *Attorney, Agent, or Firm* — Pauley Erickson & Swanson

(57)　　　　ABSTRACT

A suspended conveyor includes a rail and a conveying means, which is movably mounted on the rail in a conveying direction and includes carriers, for releasable holding suspended transportation means. The suspended conveyor includes a special clearing arrangement for clearing at least a section of the rail of transport means. The clearing arrangement generally includes a clearing device, which is either movably arranged with a guide bearing along the rail section and includes a clearing element or is arranged in a fixed position. Furthermore, the clearing arrangement includes an actuating arrangement that is configured to move the clearing device from a standby state to a clearing state. In the clearing state, the clearing element is configured to release the transport means from the carriers in the rail section by a relative movement of the clearing device to the conveying means.

20 Claims, 12 Drawing Sheets

(56)                    References Cited

U.S. PATENT DOCUMENTS

| | | | | | |
|---|---|---|---|---|---|
| 5,076,417 | A | * | 12/1991 | Santicchi | .............. B65G 47/61 |
| | | | | | 198/465.4 |
| 5,141,094 | A | * | 8/1992 | Speckhart | ............. B65G 47/61 |
| | | | | | 198/486.1 |
| 5,664,659 | A | * | 9/1997 | Gaertner | ................ B65G 47/61 |
| | | | | | 198/465.4 |
| 5,927,472 | A | * | 7/1999 | Neef | ...................... B65G 47/61 |
| | | | | | 198/465.4 |
| 8,640,854 | B2 | * | 2/2014 | Winkler | .............. B65G 19/025 |
| | | | | | 198/465.4 |
| 10,112,783 | B2 | * | 10/2018 | Stauber | ................. B65G 47/61 |

FOREIGN PATENT DOCUMENTS

| | | | |
|---|---|---|---|
| DE | 298 15 925 | U1 | 1/2000 |
| DE | 10 2011 119 807 | A1 | 5/2013 |
| EP | 0 603 468 | A1 | 6/1994 |
| EP | 1 475 323 | A1 | 11/2004 |
| GB | 1 373 759 | A | 11/1974 |

OTHER PUBLICATIONS

EPO (Munchen, DE), English machine translation of Form No. 1507N, Communication and No. 1503 03.82, Ext. EP Search Report for European Patent Appln. No. EP 24157723.8, dated Jul. 4, 2024 (8 pp.).

* cited by examiner

SUSPENDED CONVEYOR

CROSS-REFERENCE TO RELATED APPLICATIONS

Swiss Patent Application No. 000158/2023, filed 17 Feb. 2023, the priority document corresponding to this invention, to which a foreign priority benefit is claimed under Title 35, United States Code, Section 119, and its entire teachings are incorporated, by reference, into this specification.

FIELD OF THE DISCLOSURE

The present disclosure relates to a suspended conveyor comprising a clearing arrangement for clearing at least a portion of a rail of transportation means.

BACKGROUND OF THE DISCLOSURE

DE 1290491 B published on 6 Mar. 1969, in the name of Dürkoppwerke GmbH, relates to a circulating suspended conveyor with conveyor carriages connected to a traction means and running in a rail track, which have a destination determining device and a suspended device for a carriage- or wagon-like carrier of conveyed material which can be displaced on a rail outside the conveyor. Furthermore, workstations are arranged along the rail track of the conveyor, to each of which a receiving device and a feeding device for a material carrier are assigned.

U.S. Pat. No. 4,287,829 A published on Sep. 8, 1987, in the name of Nakanishi Metal Works Co., Ltd., relates to a conveyor comprising a number of flights attached to a drive chain on a power line. Each flight support member includes a flight pivotally mounted at its upper portion and a stopper which stops the flight in a vertical, downward position in which the flight can engage the free carriage in a carrier on a free line. The stopper has an outwardly extending portion that disengages the pusher. A disengaging device is arranged on a conveyor belt at a point where the carrier is to be brought to a standstill. The disengaging device has a lifting element that projects into the movement path of the disengaging part of the stopper. When the carrier reaches the location, the disengaging part of the stopper comes into contact with the lifting element of the stopper, which already protrudes into the path, and the stopper is lifted, whereupon the disengaging part is released from the stopper and uncoupled from the carriage. This brings the carriage to a standstill.

SUMMARY OF THE DISCLOSURE

Suspended conveyor systems have proven to be an efficient means of transporting, buffering, sorting and long-term storage of all types of goods in automated warehouses, in extensive production facilities and generally for transporting and conveying goods. In particular, varying unit loads such as clothing, consumer goods and the like can be transported efficiently. In suspended conveyor systems, the goods are either suspended in a suitable manner directly on individual conveying means of the suspended conveyor or picked up and transported using suitable means of transportation, such as transport bags or clothes hangers, which are themselves stored suspended on the conveying means.

Suspended conveyors are usually extensive systems and often extend between buildings or across parts of buildings that are connected by (fire protection) doors. One possible field of application of the disclosure relates to the handling of hazardous situations, as these doors must be able to be closed without interference. Clearance arrangements according to the disclosure can be used to clear predetermined rail sections of the suspended conveyor of transportation means in the event of a hazardous situation, for example in the event of a fire. This is because if there are means of transportation with transported goods in the area of the doors, the means of transportation (and the transported goods) can hinder or completely prevent the doors from closing. However, suspended conveyor systems, in particular suspended conveyors, from the state of the art do not have a satisfactory clearing arrangement for clearing rail sections of the transportation means located therein.

It is therefore a task of the disclosure to further develop the prior art in this respect. Clearing arrangements according to the disclosure can be used in many different ways. A suspended conveyor according to the disclosure comprising a clearing arrangement addresses the disadvantages of the prior art.

Typically, the suspended conveyor according to the disclosure comprises a rail and a conveying means, which is movably mounted on the rail in a conveying direction and comprises carriers for releasable holding suspended transport means.

In the context of the present disclosure, the conveying means can be understood to be, for example, a transport trolley or a conveyor chain. The suspended conveyor can be designed as a circulating conveyor. The carriers of the conveying means can be designed as hooks, eyelets, rods or the like for detachably holding suspended transport means. Depending on the area of application, the conveyor means can be designed as a continuous circulating conveyor, for example in the form of a conveyor chain.

In an advantageous embodiment of the disclosure, the suspended conveyor comprises a special clearing arrangement for clearing at least a section of the rail of transport means. Transport means are, in particular, clothes hangers or transport bags which have a holding means with which they can be detachably attached to the carriers of the conveyor. The holding means of the transport means can be designed as a hook or eyelet, for example. The carriers are designed to correspond to the retaining means.

The clearing arrangement generally comprises a clearing device with a clearing element that can be brought into engagement with the transport means arranged on the rail. The clearing device can be fixed, for example on the rail or on a building wall. Alternatively, the clearing device can be arranged with a guide bearing so that it can move along a section of the rail. Typically, the clearing device is movably arranged in its own rail segment along the rail. The rail segment of the clearing device can be attached to the rail.

Furthermore, the clearing arrangement comprises an actuating arrangement, which is designed to move the clearing device from a standby state to a clearing state. In the clearing state, the clearing element is typically designed to release the transport means from the carriers in the rail section by a relative movement of the clearer to the conveying means.

Depending on the embodiment, the actuating arrangement is designed to move the clearing device along the rail section. In alternative embodiments, the actuating arrangement is only designed to move a stationary clearing device, which is fixed in its position relative to the rail, from a standby state to a clearing state. The relative movement of the conveying means to the clearing device is achieved by moving the conveying means along the rail.

The relative movement of the clearing device to the conveying means can, depending on the configuration, be achieved by the movement of the clearing device along the rail section, when the conveying means (or the conveying means) is stationary. Preferably, the actuating arrangement has a cable pull for this purpose. The cable pull connects the clearing element to a secured weight, whereby the weight is designed to exert a pulling force on the clearing element after release by means of the cable pull. In a preferred embodiment, the weight is secured by means of an electro-magnet. This has the advantage of releasing the weight in the event of a power failure or power interruption. In this way, an autonomous release of the actuation arrangement and thus of the clearing device can be achieved.

In some embodiments, the clearing element is designed to carry the released transport means in the clearing state. This is advantageous, as the released transport means are transported out of the area of the suspended conveyor to be cleared by the clearing element of the clearing device. If the clearing arrangement is arranged in the closing area of a fire door, this allows the door to close unhindered. Alternatively, the clearing arrangement can also be designed to clear a section of the rail in front of a window, a hatch or an opening in general, such as in front of a door.

In some embodiments, the clearing element is arranged on a base of the clearing device so as to be pivotable about a pivot axis between a standby position and a clearing position. The pivot axis can be aligned perpendicular to the conveying direction.

Depending on the design, the clearing device has a tilting device which is arranged between the guide bearing and the clearing element and is set up to move the clearing element relative to the guide bearing about a tilting axis from a standby position to a tilting position. The tilting device can be provided as an alternative or in addition to the pivoting arrangement of the clearing element. The tilting axis is preferably arranged parallel to the conveying direction. In particular, the base of the tilting device can be tilted about a tilting axis when the clearing device is moved from the standby state to the clearing state.

In some embodiments, the tilting device has at least one spring element. The spring element is pre-tensioned in the standby position and locked by a retaining element. The retaining element can be secured by a securing finger of the clearing device, so that the securing finger releases the retaining element by pivoting the clearing element and the pre-tensioned spring element moves the clearing element from the standby position into the tilting position. In particular, the spring element of the tilting device is arranged with its spring axis perpendicular to the tilting axis. Depending on the configuration, the tilting device is designed as a parallelogram, with the spring element connecting two opposite corner points of the parallelogram. The parallelogram preferably comprises at least two parallel connecting elements, each of which connects an upper part and the base via pivot bearings. The upper part is usually aligned parallel to the base so that the upper part can be tilted parallel to the base about a second tilting axis. The second tilting axis is essentially parallel to the (first) tilting axis.

In some embodiments, a stop element is arranged on the tilting device, which in the ready position rests against a stop that is fixed in relation to the rail section in order to hold the clearing device in a start position and to release the movement of the clearing device along the rail section in the tilting position. Preferably, the stop element is arranged on the upper part of the tilting device so that the stop element can be tilted about the second tilting axis. The stop element can, for example, be designed as a stop finger, lever, stop or pin.

In a preferred embodiment, at least one (further) spring element connects the clearing element and the base so that the clearing element can be pivoted from the standby position to the clearing position via a dead center, making it more difficult to pivot back. Among other things, this has the advantage that the clearing element is secured in the standby position against unintentional pivoting into the clearing position.

In some embodiments, the clearing element has a blade with a release section and an adjoining collecting section. The release section is preferably designed to release the transport means from the carriers and the collecting section is preferably designed to collect and carry the released transport means.

In preferred embodiments, the release section has a contact contour which, in the clearing position of the blade, is aligned in such a way that it forms a slope towards the collecting section for lifting the transport means from the carriers. Alternatively, or in addition, the contact contour is aligned in such a way that it forms an incline towards the collecting section for moving the transport means sideways away from the carriers.

The incline and the slope are preferably designed in such a way that the lifting and moving away of the transport means from the carriers takes place in a superimposed movement. The contact contour can be designed as an edge, for example. The blade is advantageously made of (stamped) sheet metal to ensure the necessary rigidity while remaining cost-efficient. However, alternatives are also possible, for example the blade can be made from a rod-shaped element that provides an edge as the contact contour of the release section.

A starting bevel is preferably arranged at the proximal end of the release section. During the relative movement, this bevel initially establishes contact between the blade and the holding means of the transport means. The starting slope leads into the incline and/or the slope of the release section so that excessive accelerations are avoided on contact with the holding means and these are not released from the carriers in an uncontrolled manner.

The collecting section is preferably designed as at least one indentation (of the clearing element or of the blade), the distal end of which is formed by a stop, in particular by a nose. The detached transport means are typically collected and carried in this indentation. The nose can have a curvature so that it is hook-shaped. This allows the means of transport to be collected more easily and minimizes the risk of the released means of transport accidentally falling down.

In order to minimize rotation of the clearing element about an axis parallel to the conveying direction in the clearing state, the guide bearing preferably forms an abutment for the clearing element. For this purpose, the guide bearing comprises at least one bearing, in particular two bearings, preferably three bearings. Depending on the design, the at least one bearing is designed as a roller bearing or plain bearing, whereby its axis of rotation is aligned essentially perpendicular to the conveying direction. In the case of two or three roller bearings, the axes of rotation are aligned parallel and/or perpendicular to each other. Preferably, the guide bearing comprises a guide rail, in particular in the form of a rail segment, which is arranged along the rail section of the suspended conveyor to be cleared. Depending on the application, the clearing device can have two or more guide bearings. Preferably, the guide bearings are arranged one behind the other and/or next to each other in the conveying direction.

Depending on the design, the transport means have hook-shaped or eyelet-shaped holding means. The transport means are designed in particular as clothes hangers and/or transport pockets. However, transport means in the sense of the present disclosure are not limited to clothes hangers or transport bags, but include other transport means accessible for hanging transport, such as transport nets, bags or carrying racks or transport loops.

In the standby state, the pivot axis and the tilting axis can be aligned essentially perpendicular to each other. During tilting of the base about the tilting axis, the pivot axis is also tilted, whereby it remains perpendicular to the tilting axis. In particular, the tilting axis is aligned essentially parallel to the conveying direction. In particular, the pivot axis is aligned essentially perpendicular to the conveying direction. This means that in the standby state, the pivot axis is aligned vertically in space and the tilting axis is horizontal.

To ensure reliable operation of the clearing device, the tilting device is preferably designed as a parallelogram. The parallelogram typically comprises the base, an upper part arranged opposite the base and at least two connecting elements. The connecting elements are each connected to the upper part via a pivot bearing and to the base via a pivot bearing. The at least one spring element of the tilting device connects the pivot bearings of the parallelogram diagonally. Once released, the spring element, which is pre-tensioned in the ready state, causes the base to deflect relative to the upper part of the parallelogram, preferably by tilting the base and upper part (parallel to each other).

In advantageous embodiments, the actuating arrangement has a cable pull that connects the clearing element to a secured weight. The weight is preferably designed to exert a pulling force on the clearing element after its release by means of the cable pull. Depending on the design, the traction cable is attached to a fastening point on the clearing device blade.

The attachment point is preferably arranged offset outwards from the pivot axis so that a tensile force applied to the attachment point causes a torque on the blade about the pivot axis. In some embodiments, the weight is secured with an electrical locking mechanism. Preferably, the safety mechanism is set up to release the weight in the event of a power failure or a power interruption. For example, the securing mechanism can comprise an electromagnet to hold the weight by means of a magnetic force.

Furthermore, a method for clearing the rail of the suspended conveyor section by section is proposed, comprising at least the following steps:

Providing an suspended conveyor comprising a rail and a conveying means which is movably mounted on the rail in a conveying direction and comprises carriers for releasable holding suspended transport means;

Providing a clearing arrangement along a section of the rail, which comprises a clearing device with a clearing element, and an actuating arrangement which is designed to move the clearing device from a standby state to a clearing state;

Bringing the clearing element into engagement with the transport means and transferring the clearing element into a clearing state by a relative movement of the clearing device to the conveying means, whereby the transport means are released from the carriers in the rail section.

The clearing device can comprise a guide bearing, by means of which the clearing device is movably arranged on the rail section and is moved along the rail section in the clearing state by means of the actuating arrangement. Preferably, the guide bearing is moved in its own rail segment. The clearing element can be arranged on a base of the clearing device so that it can pivot about a pivot axis between a standby position and a clearing position.

In one variation, the clearing device has a tilting device and the clearing element can be moved in the clearing position relative to the guide bearing about a tilting axis from a standby position to a tilting position. The tilting device can have at least one spring element, which is pre-tensioned in the ready position and is locked by a retaining element. The retaining element usually releases the pre-tensioned spring element in the clearing state and the clearing element is thus moved from the standby position into the tilting position by the spring element.

A stop element can be arranged on the tilting device, which in the ready position rests against a stop that is fixed in relation to the rail section and holds the clearing device in a start position and releases the movement of the clearing device in the clearing state.

The features of the suspended conveyor according to the invention also apply to the method for clearing the rail of the suspended conveyor section by section and vice versa.

BRIEF DESCRIPTION OF THE DRAWINGS

Aspects of the disclosure are explained in more detail with reference to the embodiments shown in the following figures and the associated description. It shows.

DESCRIPTION OF THE EMBODIMENTS

Reference is now made in detail to certain embodiments exemplified in the accompanying drawings, in which some but not all features are shown. Indeed, the embodiments disclosed herein may be embodied in many different forms and should not be understood to be limited to the embodiments set forth herein; rather, these embodiments are provided in order for this disclosure to comply with applicable legal requirements. Whenever possible, like reference numbers are used to refer to like components or parts.

Figure 1:
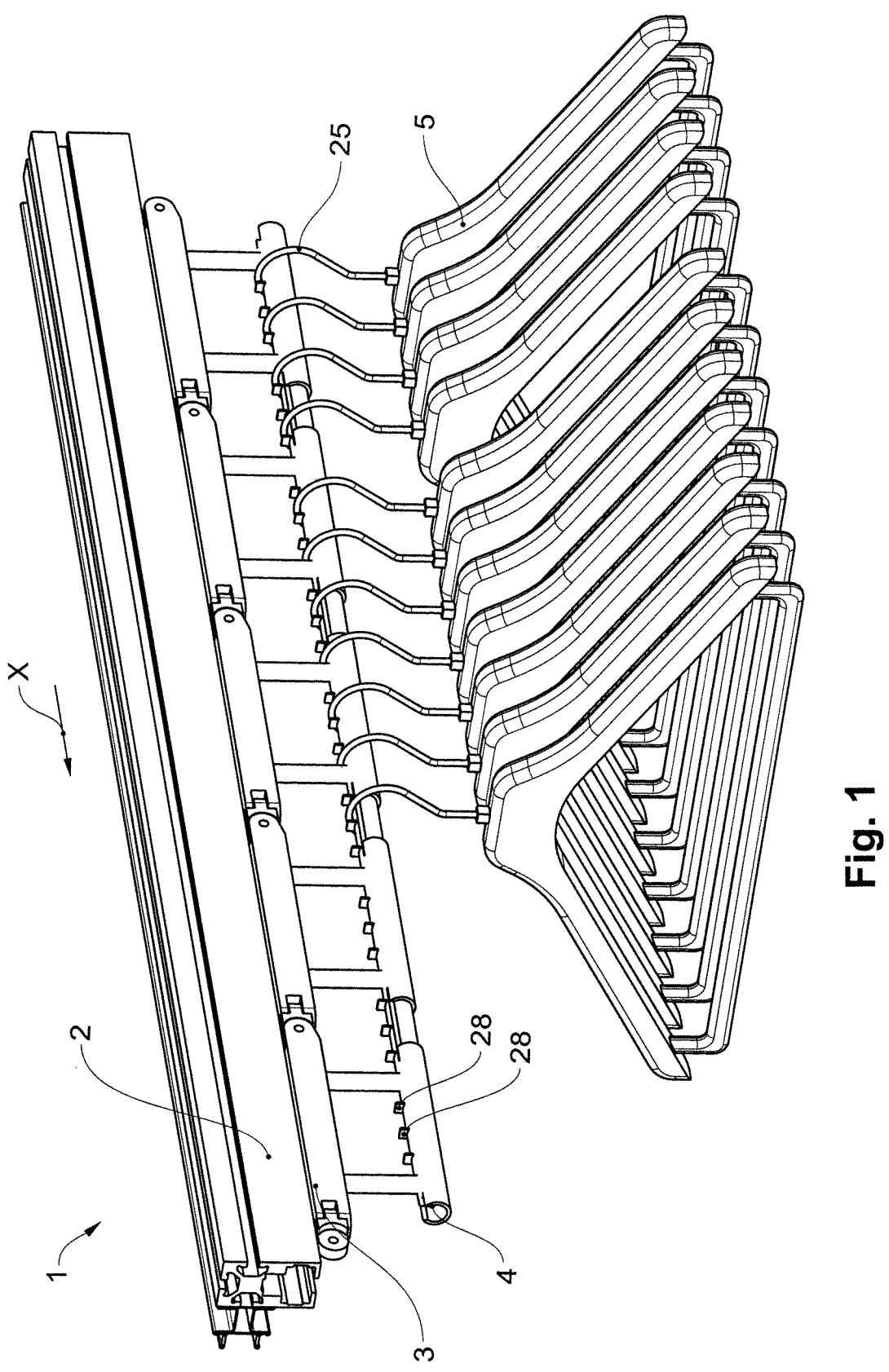
FIG. 1 shows a first embodiment of an suspended conveyor according to the disclosure in a perspective view.

FIG. 1 shows a first embodiment of an suspended conveyor 1 according to the disclosure in a perspective view. The suspended conveyor 1 has a rail 2 and a conveying means 3 movably mounted thereon. In the embodiment shown here, the conveying means 3 is a continuous conveying means 3 consisting of individual, interconnected links. The conveying means 3 has carriers 4 for detachably holding suspended transport means 5. The carriers 4 are each rod-shaped and connected to the links. The carriers 4 of the first embodiment can each carry one or more transport means 5. The transport means 5 are designed here as clothes hangers with a holding means 25, in particular a hook 25. For spacing individual hooks 25, at least one of the carriers 4 preferably has one or more protrusions 28, which are designed to support a respective hook 25 during transportation. Alternatively, or in addition to the bulges 28, recesses are also conceivable. During operation, the conveyor 3 moves the clothes hangers 5 along the rail 2 in the conveying direction X.

Figures 2, 3:
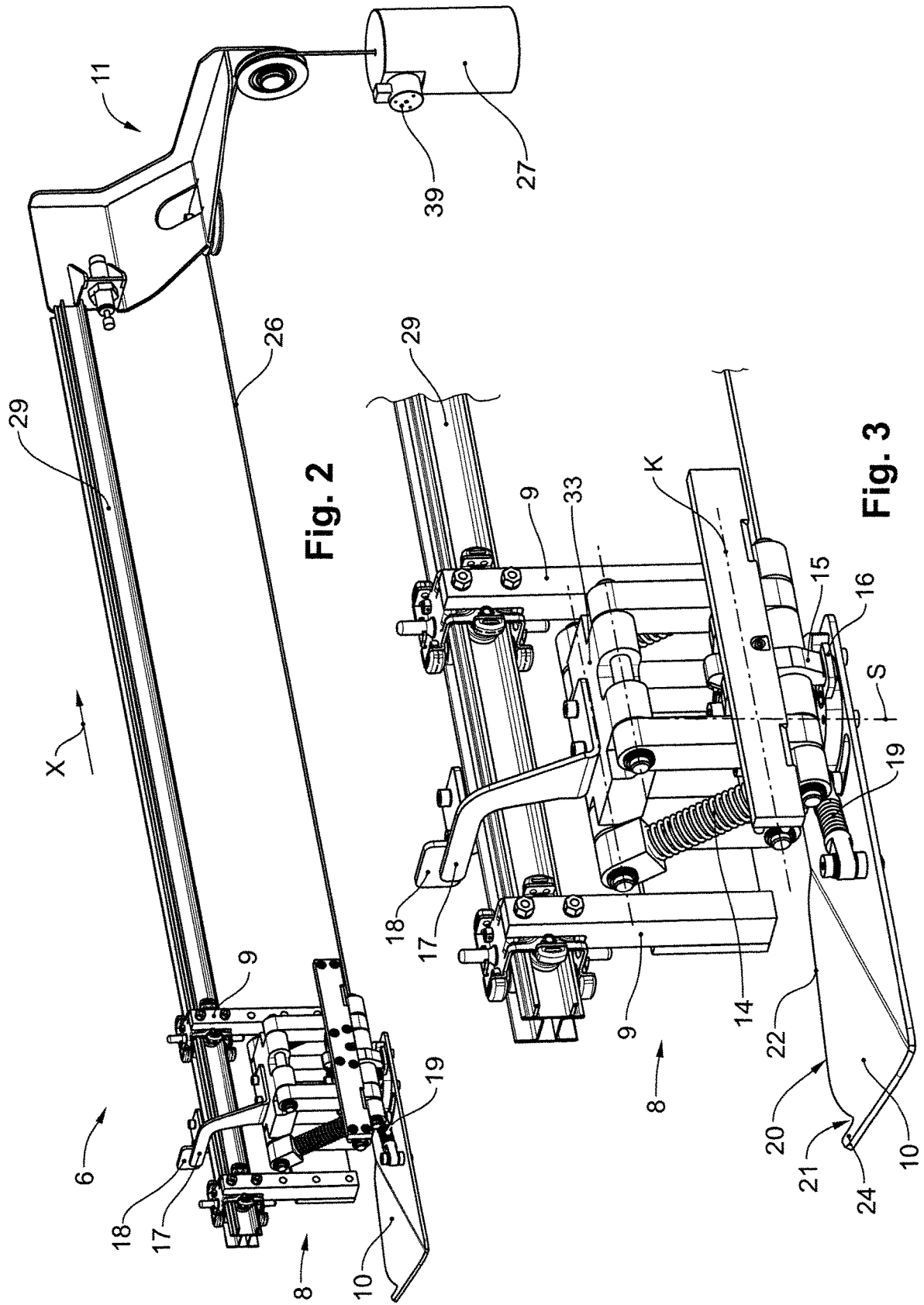
FIG. 2 shows a first embodiment of an clearing arrangement according to the disclosure in a perspective view.
FIG. 3 shows an enlarged view of the first embodiment of an clearing arrangement according to the disclosure.

FIG. 2 shows a first embodiment of an clearing arrangement according to the disclosure in a perspective view and FIG. 3 shows an enlarged view of the first embodiment of an clearing arrangement according to the disclosure. The first embodiment of a clearing arrangement 6 shown in FIG. 2 comprises a clearing device 8 and an actuating arrangement 11. The clearing arrangement 6 is designed for clearing at least one section of the rail of transportation means. The clearing device 8 is movably arranged with a guide bearing 9 along the rail section 7. In the embodiment shown, the clearing arrangement 6 comprises a rail segment 29, which is arranged in particular on the rail 2 of the suspended conveyor 1. The guide bearing 9 is movably mounted in the rail segment 29, in particular against or in the conveying direction X. The actuating arrangement 11 is designed to move the clearing device 8 from a standby state to a clearing state. In the embodiment shown, the actuating arrangement 11 is also designed to move the clearing device 8 along the rail section. The clearing device 8 can be moved both along and against the conveying direction X.

FIG. 3 shows an enlarged view of the clearing device 8 of FIG. 2. The clearing device 8 comprises a clearing element 10. In the clearing state, the clearing element 10 is designed to release the transport means from the carriers in the rail section by a relative movement of the clearing device 8 to the conveying means. In other words, the clearing element 10 releases the hangers from the carriers by moving the clearing device 8 along the rail section. Preferably, the clearing element 10 is also designed to pick up and carry the detached coat hangers in the clearing state. For this purpose, the clearing element 10 preferably has a blade 10 with a release section 20 and an adjoining collection section 21. In particular, the release section 20 has an edge 22 as a contact contour. This contact contour 22 has a starting bevel at the beginning, which establishes contact with the holding means of the transport means during the relative movement thereto. In the clearing position of the blade 10, the edge 22 is aligned in such a way that it forms a slope towards the collecting section 21 for lifting the transport means from the carriers. In the clearing position of the blade 10, the edge 22 is also aligned in such a way that it forms an incline towards the collecting section 21 for moving the transport means sideways away from the carriers. This alignment is particularly clearly visible in FIG. 6.

Figure 4:
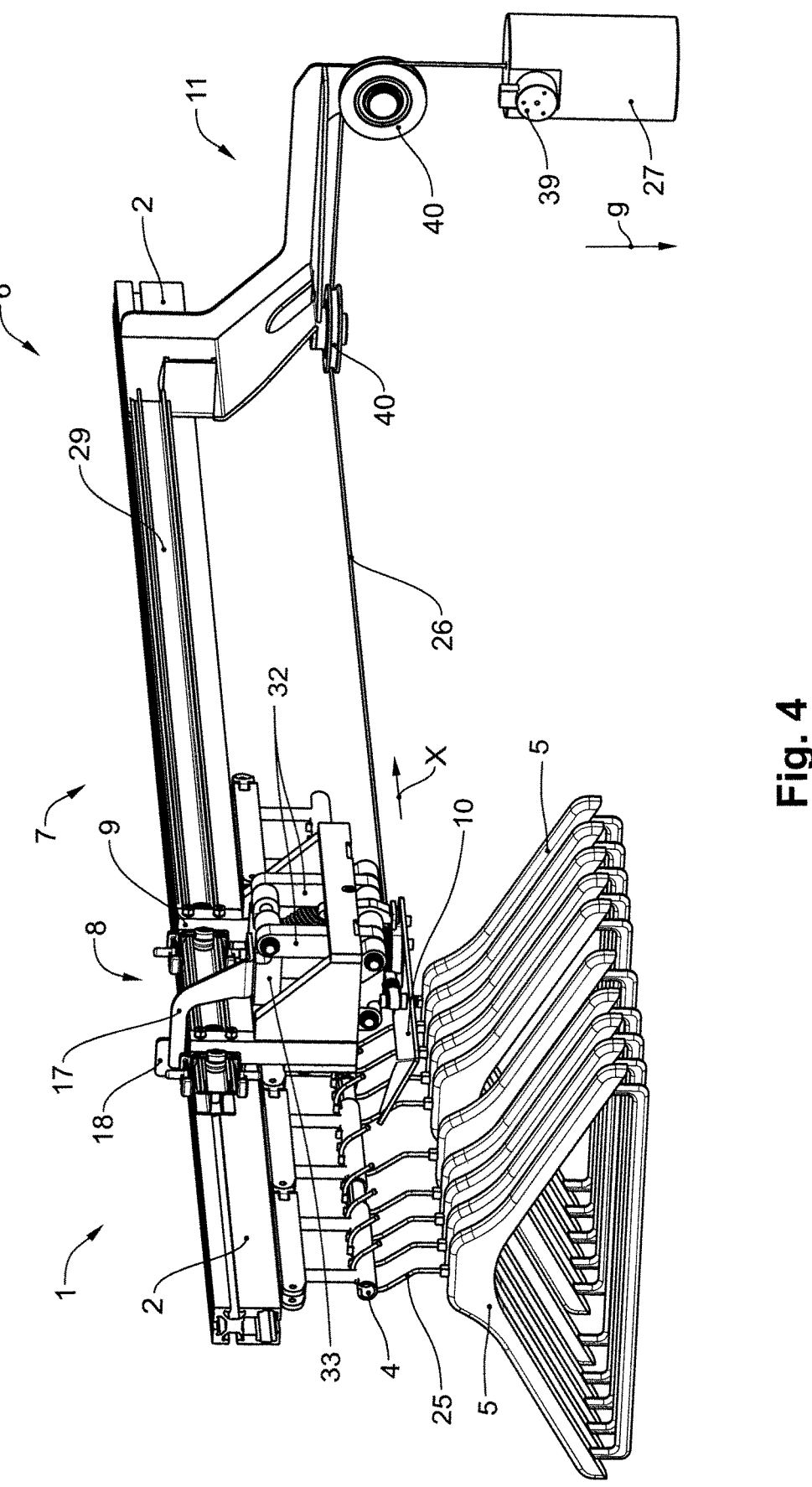
FIG. 4 shows a rail section of an suspended conveyor according to the disclosure with the first embodiment of the clearing arrangement in the standby state in a perspective view.
Figure 6:
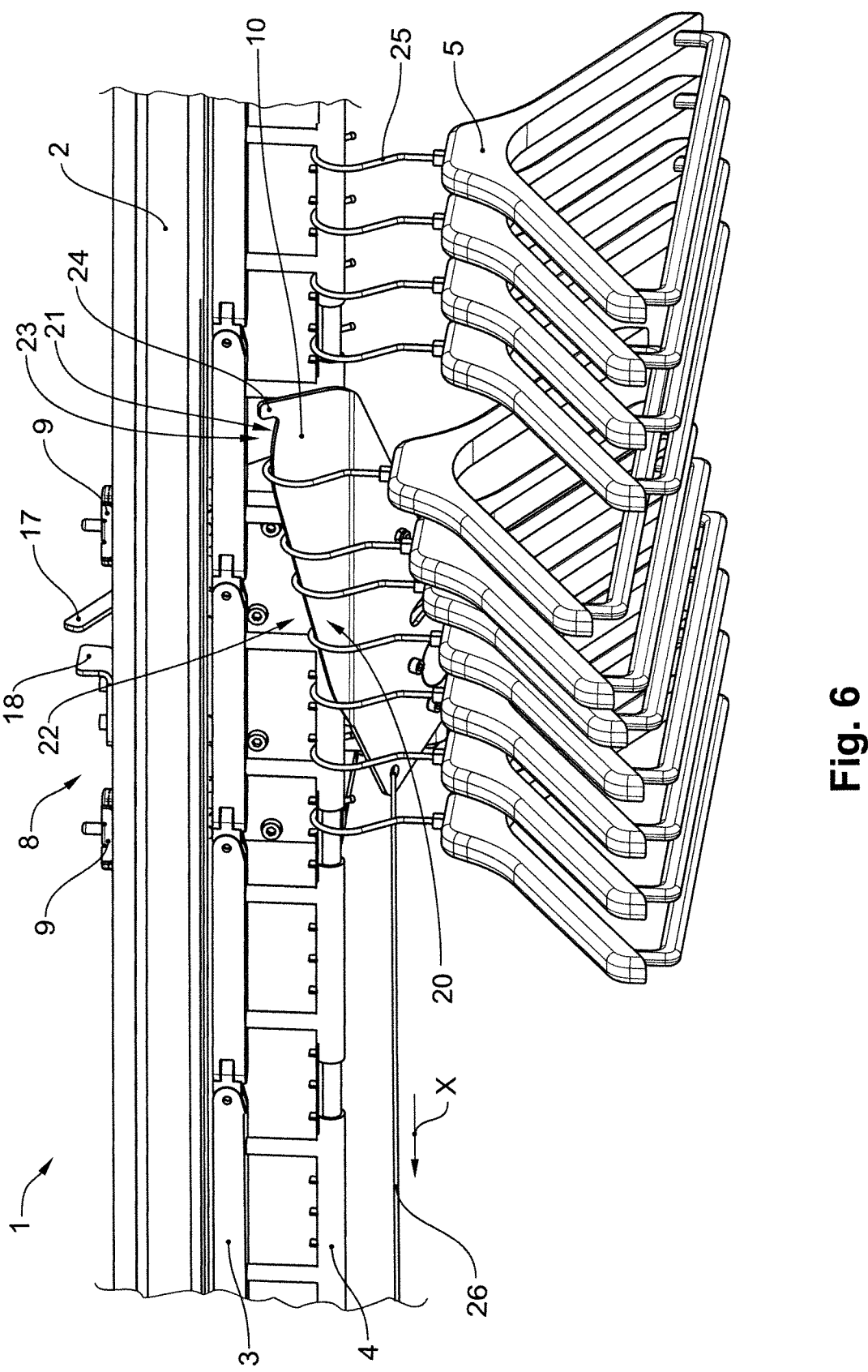
FIG. 6 shows also shows the suspended conveyor of FIG. 4 with the first embodiment of the clearing arrangement in the clearing state in a further perspective view.

FIG. 6 shows the suspended conveyor of FIG. 4 with the first embodiment of the clearing arrangement in the clearing state in a further perspective view. As can be seen, the edge 22 in this embodiment is designed to achieve the lifting and moving away of the transport means 5 from the carriers 4 in a superimposed movement. This is advantageous, as it enables a controlled release of hook-shaped holding means 25. Adjacent to the release section 20, opposite the starting slope, the collecting section 21 is formed as an indentation 23. The indentation 23 has a distal end that is designed as a stop 24, in particular as a lug 24. The indentation 23 allows the detached transport means 5 to be carried safely and minimizes the risk of the detached transport means 5 falling down.

As can be seen in FIG. 3, the guide bearing 9 forms an abutment for the clearing element 10 in the clearing state, so that rotation of the clearing element 10 about an axis parallel to the conveying direction X is minimized. In particular, double guide bearings 9 are provided for this purpose, whereby each guide bearing 9 is designed as a multi-axis roller bearing in order to increase the torsional rigidity. In order to move the clearing device 8 along the rail section, the actuating arrangement 11 has a cable pull 26, which connects the clearing element 10 to a secured weight 27. Once released, the weight 27 is designed to exert a pulling force on the clearing element 10 by means of the cable pull 26. Preferably, the cable pull 26 connects the clearing element 10 and the weight 27 via one or more deflection pulleys 40.

Figure 7:
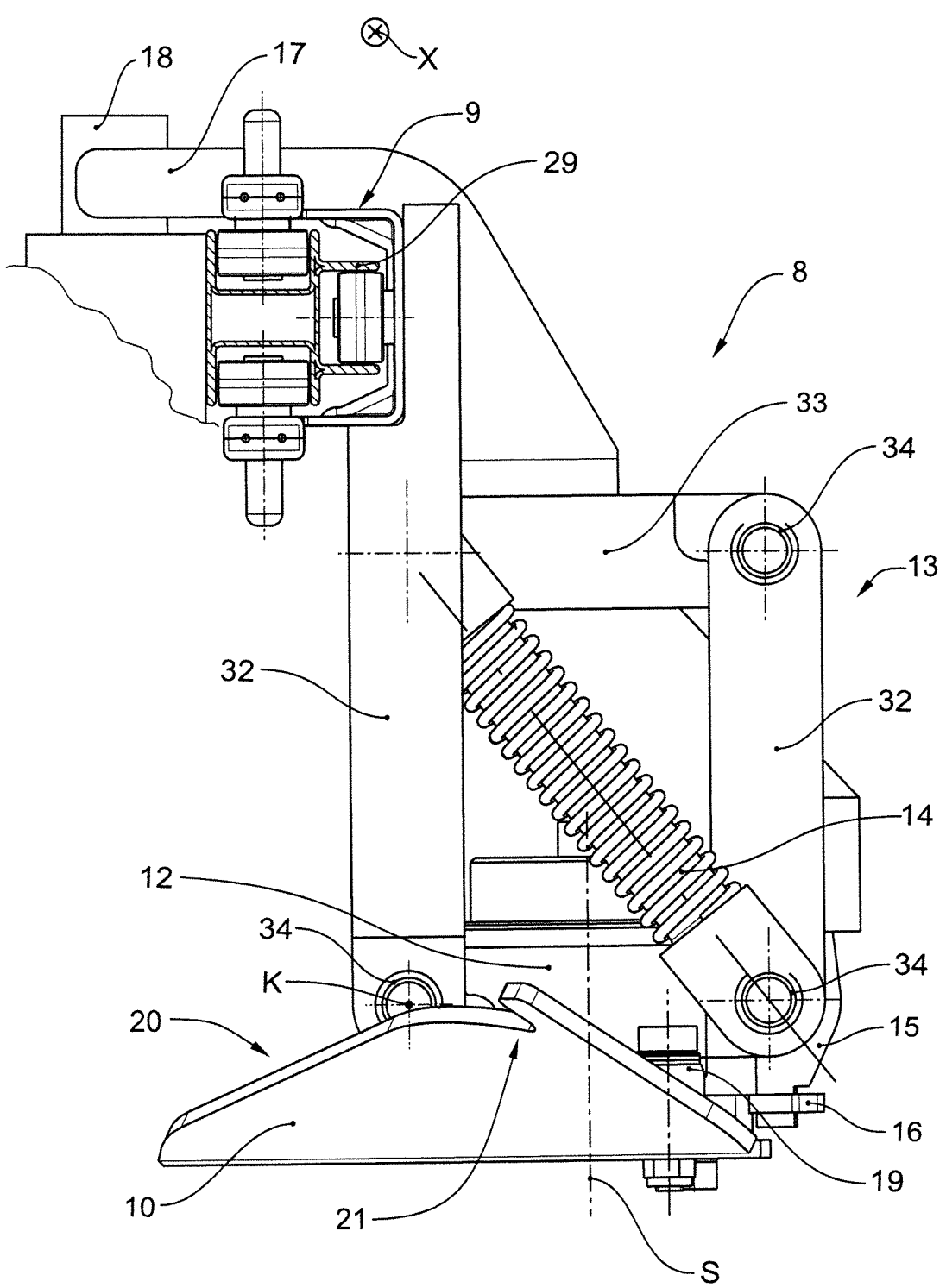
FIG. 7 shows the clearing device of the first embodiment in a side view in the operating state.
Figure 8:
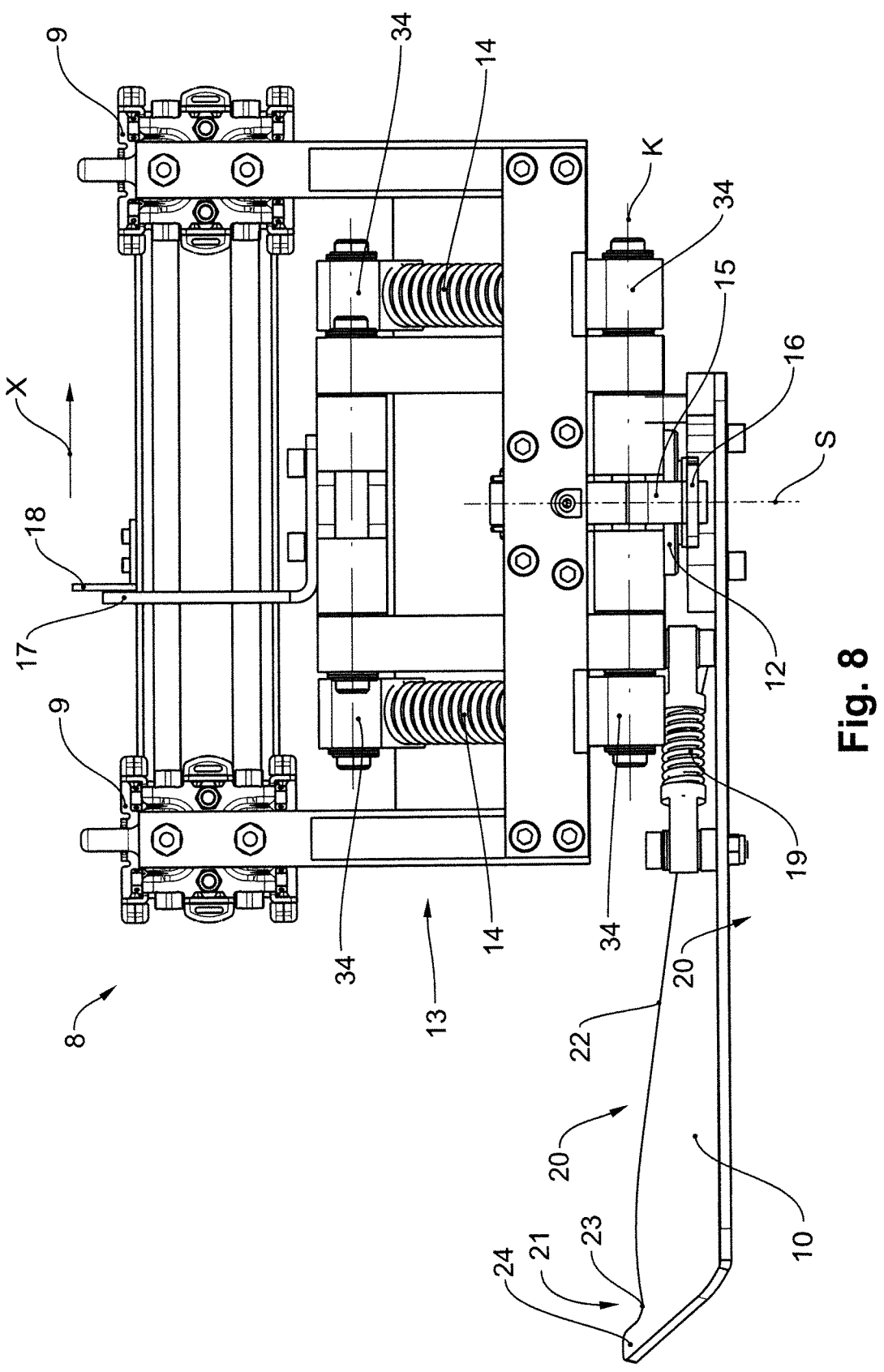
FIG. 8 shows the clearing device of FIG. 7 in a further side view.

FIGS. 7 and 8 each show a side view of the clearing device 8. In the following, the clearing device 8 is described in more detail with particular reference to these figures. In the illustrated embodiment of the clearing device 8, the clearing element 10 is arranged on a base 12 of the clearing device 8 so as to be pivotable about a pivot axis S between a standby position and a clearing position. In the standby position, the pivot axis S is oriented essentially parallel to the gravitational force g, although alternative configurations are also conceivable. Depending on the configuration, the clearing element 10 is aligned parallel to the conveying direction X in the direction of its general extension in the ready position. The clearing element 10 can generally be pivoted between 20 and 90 degrees, preferably by 30 to 70 degrees, between the standby position and the clearing position. In particular, the clearing element 10 is pivotably mounted on the base 12 in such a way that the pivoting movement is stopped when the clearing position is reached.

Figure 9:
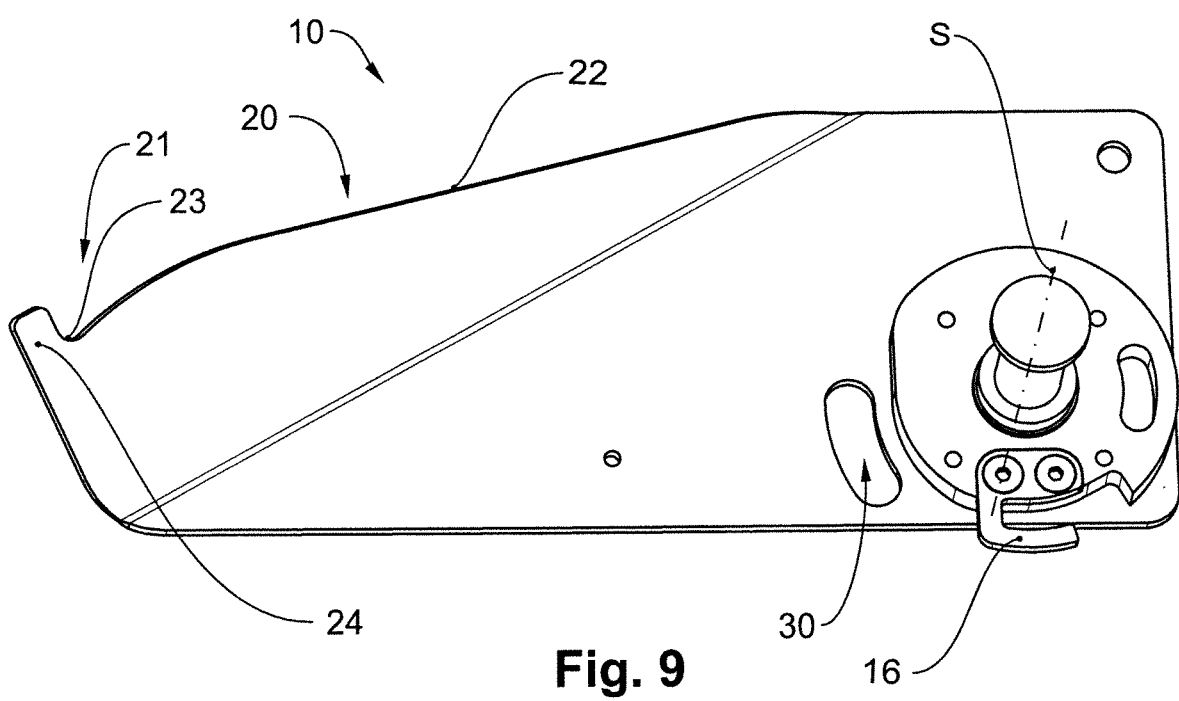
FIG. 9 shows a clearing element of the clearing device of the first embodiment in a perspective view from above.
Figure 10:
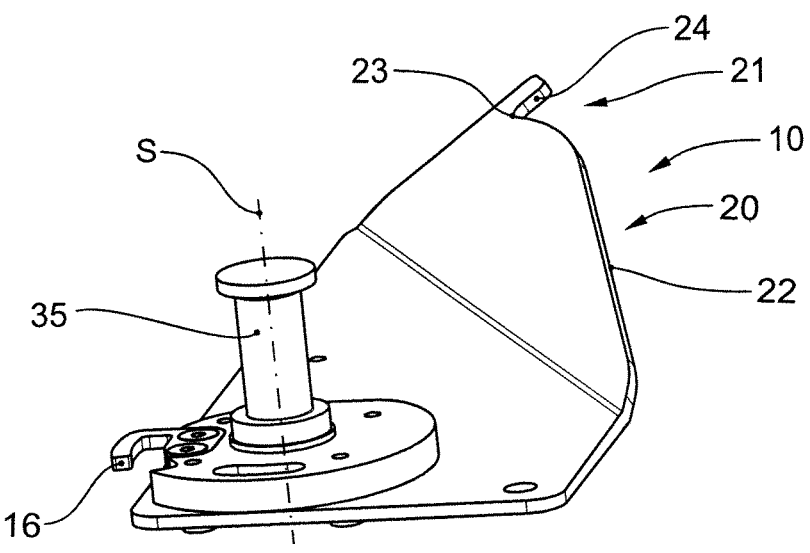
FIG. 10 shows a perspective side view of the clearing element of FIG. 9.

FIG. 9 shows a clearing element of the clearing device of the first embodiment in a perspective view from above and FIG. 10 shows the clearing element of FIG. 9 in a perspective view from the side. The clearing element 10, shown in detail in FIGS. 9 and 10 and designed as a blade 10, has a recess 30 designed as a guide slot into which the base engages. The clearing device 8 also has a tilting device. The tilting device is arranged between the guide bearing and the clearing element 10 and is designed to move the clearing element 10 relative to the guide bearing about a tilting axis K from a ready position to a tilting position. As can be seen in particular in FIG. 7, this is achieved in particular by the base 12 being tilted about the tilting axis K when the clearing device 8 is moved from the standby state to the clearing state. Typically, the tilting axis K is arranged parallel to the conveying direction X. In the embodiments shown, the tilting device 13 is designed as a parallelogram. The parallelogram has at least two parallel connecting elements 32, which connect the upper part 33 and the base 12 to each other via pivot bearings. The tilting axis K is parallel to the axes of rotation of the pivot bearings of the parallelogram. In particular, the tilting axis K is identical to the axis of rotation of the pivot bearing 34 of the base 12 facing the rail 2 and the connecting element 32.

As can be seen particularly clearly in FIG. 10, the clearing element 10 is attached to the base by means of a rotatably mounted bolt 35. FIG. 8 shows that the tilting device 13 preferably has at least one spring element 14, which is pretensioned in the ready position and locked by a retaining element 15. The retaining element 15 is secured in the standby position by a securing finger 16 of the clearing element 10, so that the securing finger 16 releases the retaining element 15 by pivoting the clearing element 10. The pre-tensioned spring element 14 is designed to move the clearing element 10 from the standby position to the tilting position after its release, whereby the base 12 is tilted about the tilting axis K for this purpose. In the embodiment shown, see FIG. 7, the at least one spring element 14 is arranged diagonally between opposing pivot bearings 34 of the parallelogram. After its release, the spring element 14 causes a parallel displacement of the connecting elements 32, so that the base 12 and thus the clearing element 10 are tilted about the tilting axis K.

Figure 12:
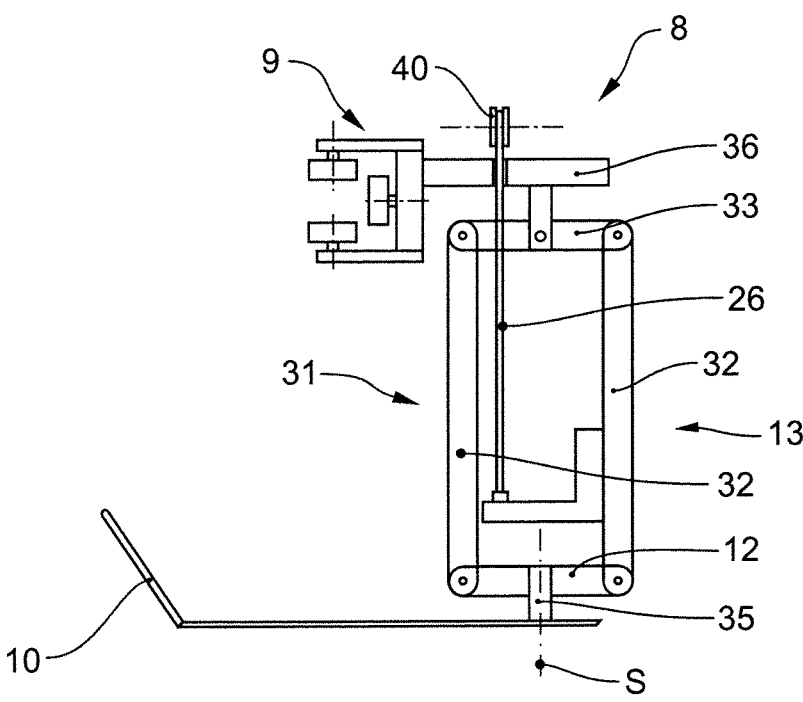
FIG. 12 shows a schematic sectional view of a third embodiment of the clearing device in the standby state.
Figure 13:
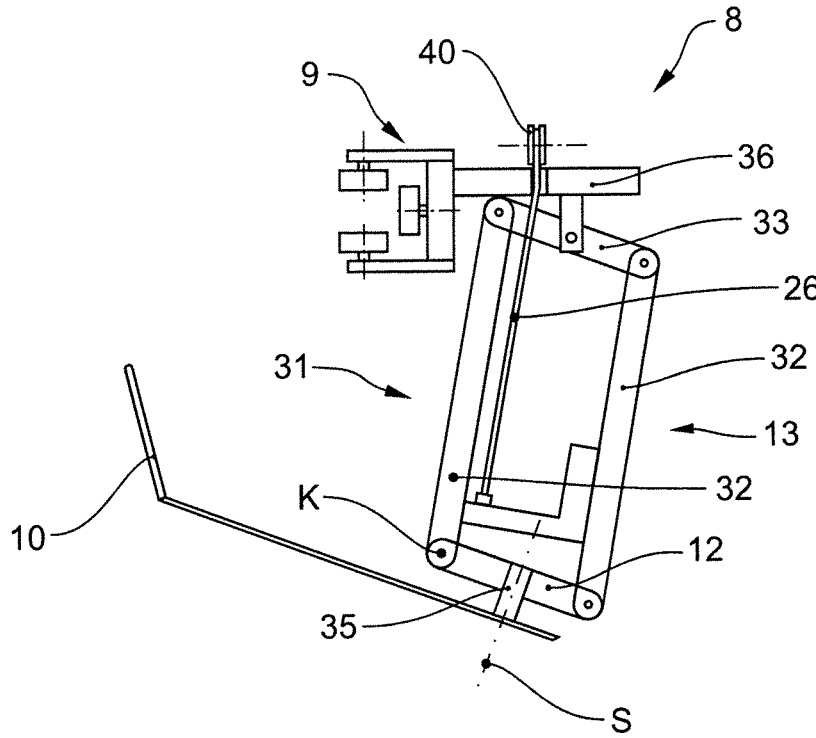
FIG. 13 shows the clearing device of FIG. 12 in the clearing state.

FIGS. 12 and 13 show a third embodiment of the clearing device 8 with an alternatively designed tilting device 13. In this embodiment, the cable 26 of the actuating device is connected to one of the connecting elements 32 of the parallelogram 31. The upper part 33 of the parallelogram 31 can be tilted parallel to the base 12 and is suspended centrally on a cantilever arm 36 so that it can be tilted. The cantilever arm 36 extends essentially horizontally and connects the guide bearing 9 with the tilting device 13. FIG. 12 shows the clearing device 8 in the standby state and FIG. 13 shows the clearing device 8 in the clearing state. The actuating arrangement, which is not shown in full, is designed to exert a tensile force on the cable 26 so that this is introduced into the connecting element 32 and the parallelogram 31 is displaced or deformed in such a way that the base 12 is tilted. The clearing element 10 attached to the base 12 is thereby moved into the tilting position or into the clearing position.

Figure 11:
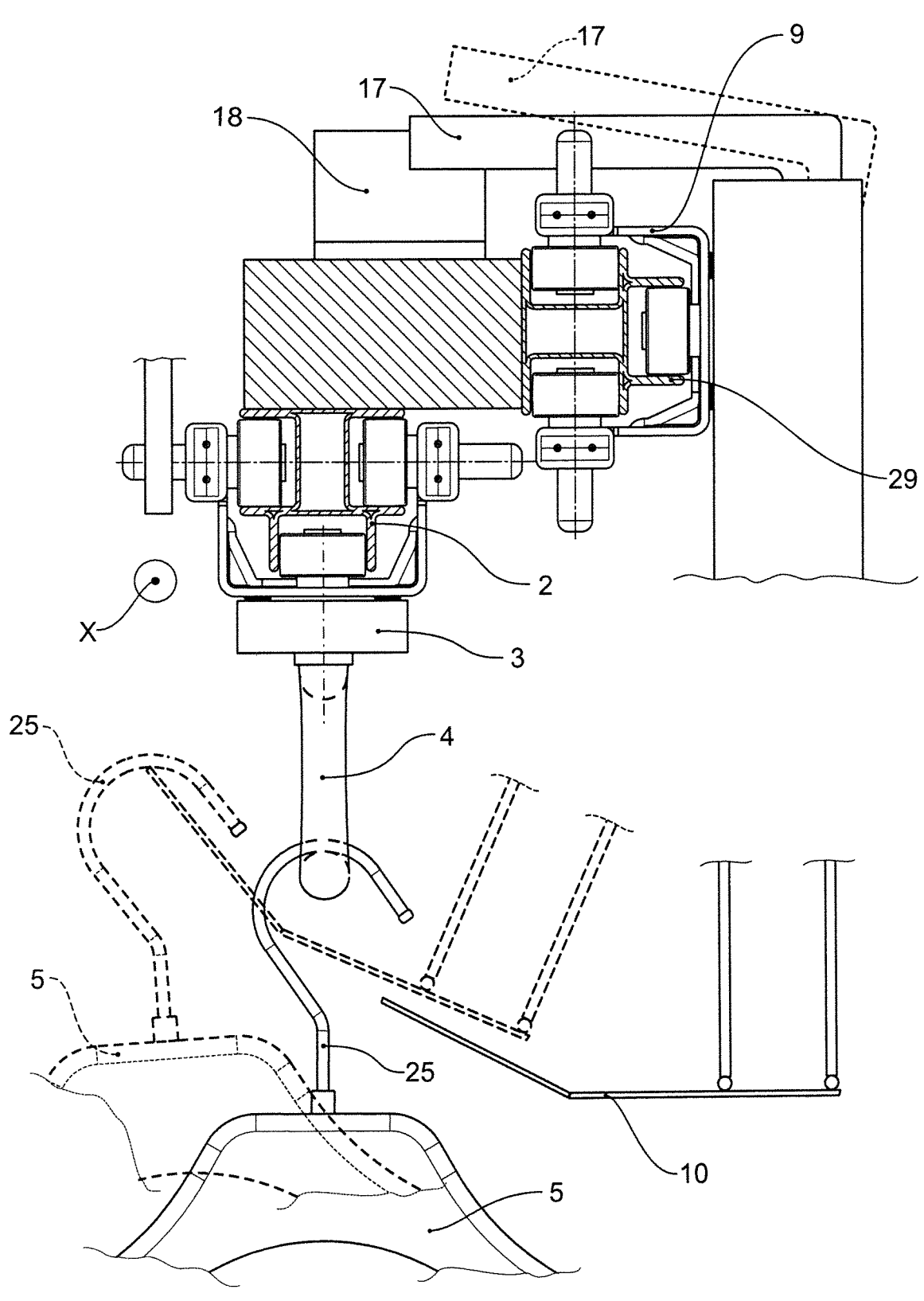
FIG. 11 shows is a schematic sectional view of a second embodiment of the clearing device, with the solid lines indicating the ready state and the dashed lines indicating the clearing state.

The embodiments shown preferably comprise a stop element, which is arranged on the tilting device, and in particular is arranged on the upper part 33. The clearing device 8 can be designed in such a way that, in the ready position, the stop element rests against a fixed stop in relation to the rail section. This stop holds the clearing device 8 in a start position when the stop element is in contact with it. In the tilted position, the stop element is released from the stop and allows the clearing device 8 to move along the rail section 7. FIG. 11 shows a schematic sectional view of a second embodiment of the clearing device, with the solid lines indicating the ready state and the dashed lines the clearing state. The positions of the stop element 17 are clearly visible here. The second embodiment of the suspended conveyor 1 in FIG. 11 is characterized by a different conveying means 3. In addition to an indicated drive means, the conveying means 3 here comprises a large number of individual carriages on which the clothes hangers 5 are held by their hooks 25.

Figure 5:
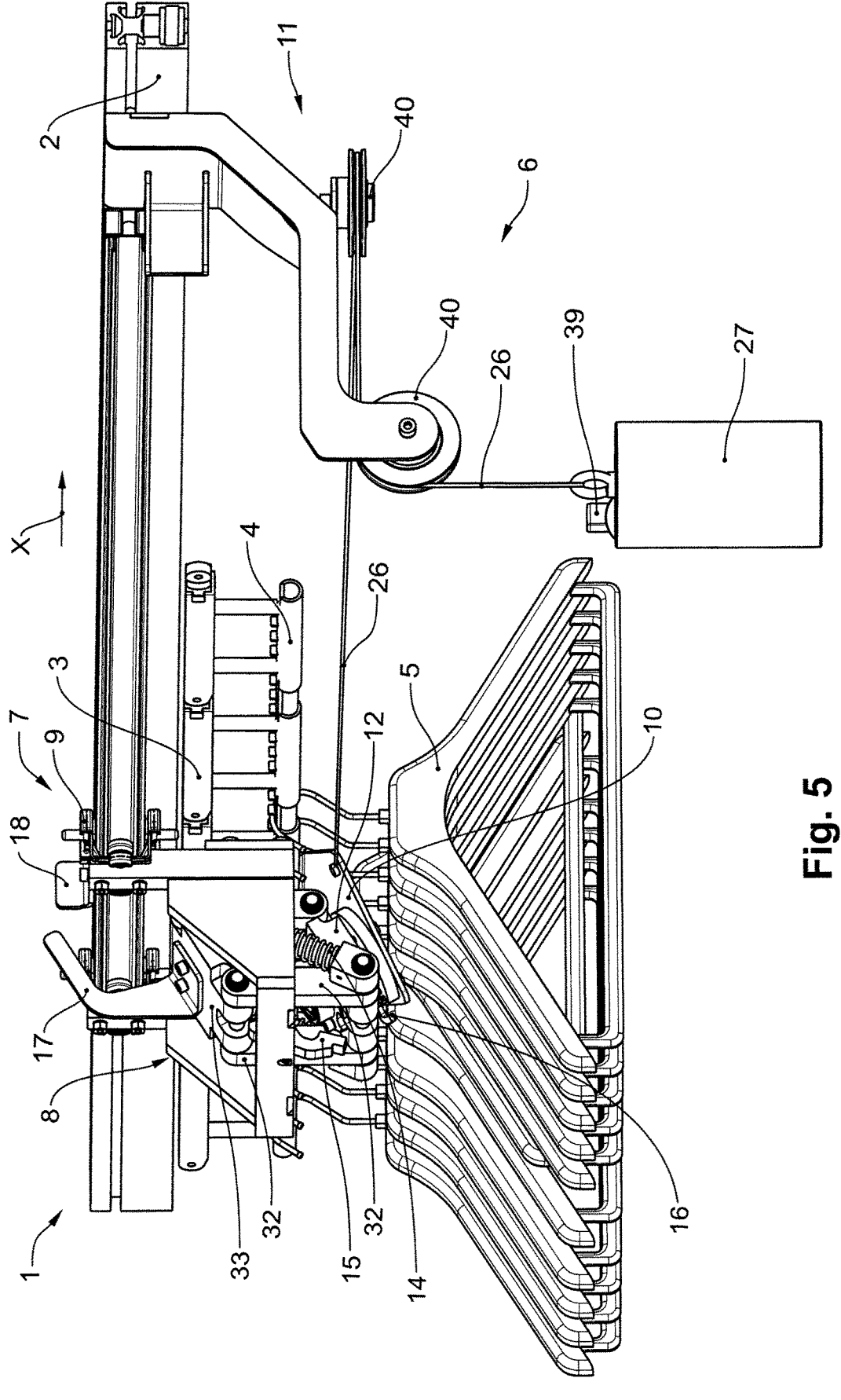
FIG. 5 shows a perspective view of the suspended conveyor of FIG. 4 with the first embodiment of the clearing arrangement in the clearing state.

FIG. 4 shows a rail section 7 of an suspended conveyor 1 according to the disclosure with the first embodiment of the clearing arrangement 6 in the ready state in a perspective view and FIG. 5 shows the suspended conveyor 1 of FIG. 4 with the first embodiment of the clearing arrangement 6 in the clearing state in a perspective view. Depending on the embodiment, in particular in FIG. 5, the attachment point of the cable pull 26 on the clearing element 10 is offset outwards from the pivot axis. As a result, the tensile force introduced into the blade 10 by the cable pull 26 leads to a torque which acts on the blade 10. This allows the blade 10 to swivel around the pivot axis. As can be seen in FIGS. 3 and 8, a spring element 19 can be arranged between the clearing element 10 and the base 12. When the clearing element 10 is pivoted from the standby position to the clearing position, the spring element 19 overcomes a dead center, making it more difficult to pivot back. Furthermore, the blade 10 is secured in the standby position against unwanted pivoting into the clearing position by the spring element 19.

Figures 14, 15:
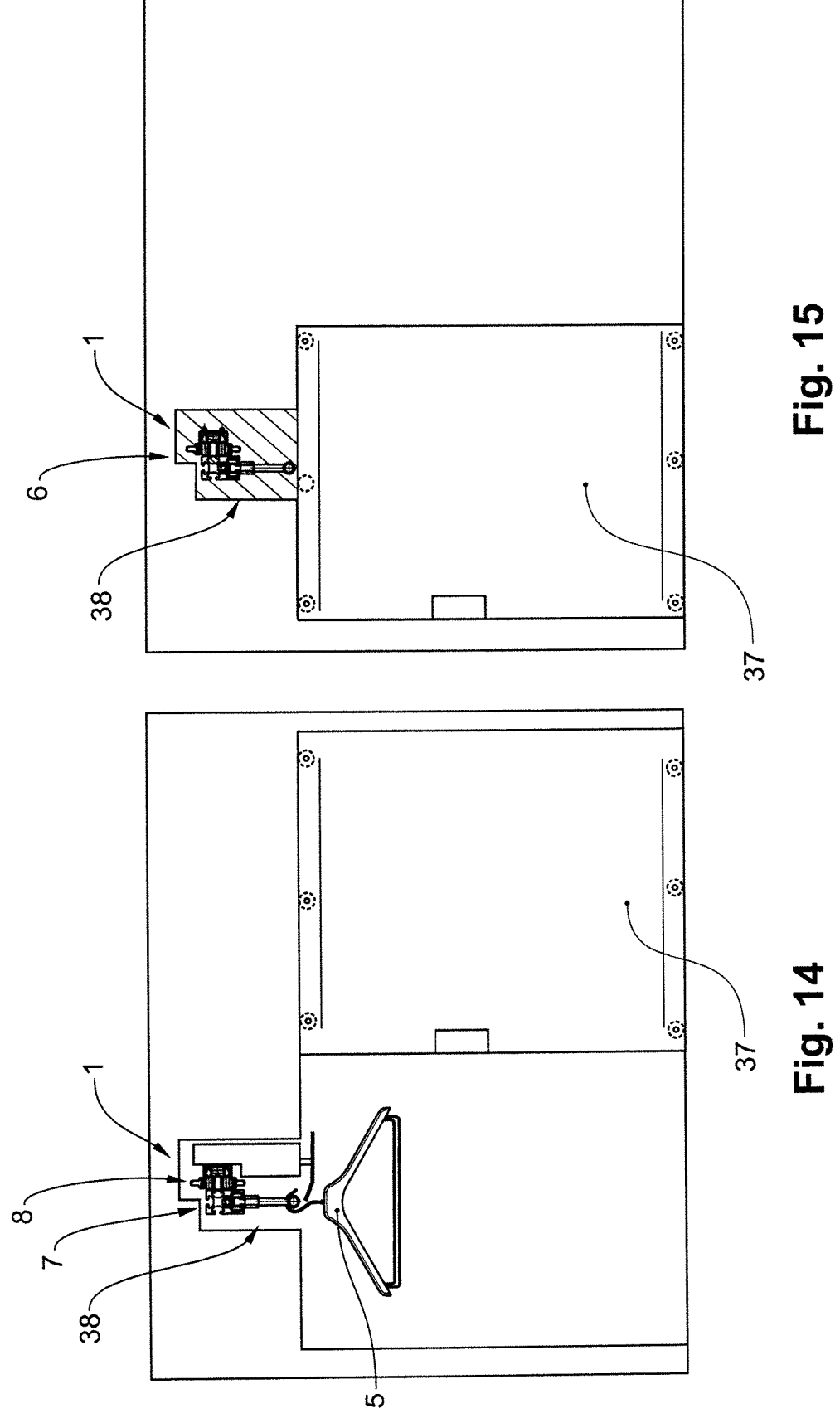
FIG. 14 shows an installation situation of an suspended conveyor according to the disclosure on a door.
FIG. 15 shows the installation situation of FIG. 14 with the door closed.
Figure 16:
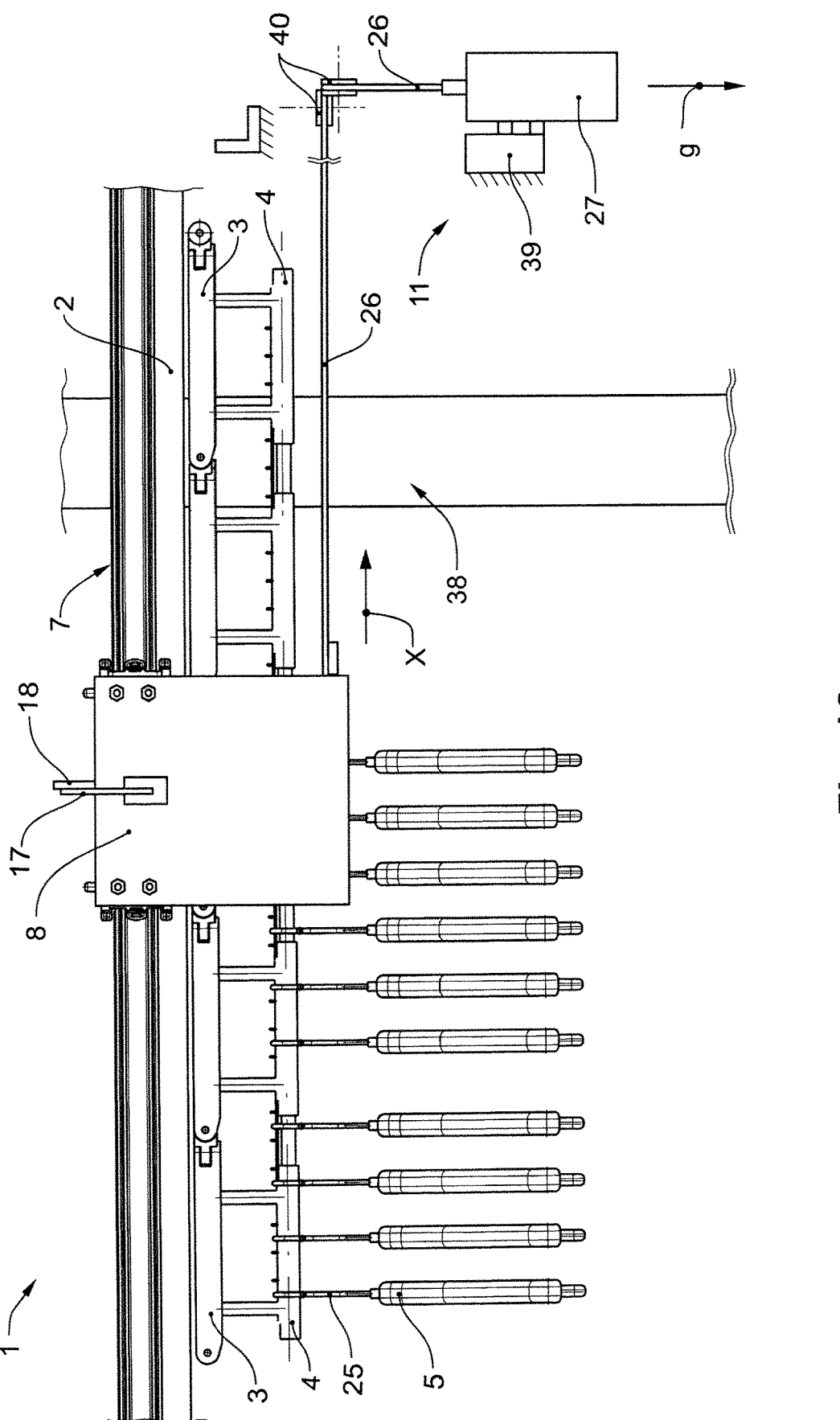
FIG. 16 shows the first embodiment in an installation situation with a door in a side view.

FIGS. 14 and 15 show an installation situation of the first embodiment of the suspended conveyor 1 at a fire protection door 37 and a feed-through 38 for the suspended conveyor 1 arranged above it. FIG. 14 shows the suspended conveyor 1 during operation and FIG. 15 shows the same suspended conveyor 1 with the fire protection door 37 in the closed state, whereby the feed-through 38 is filled with a protective material (for example with foam). FIG. 16 shows a side view of the situation in FIG. 14. The clearing device 8 can be seen, which is located at one end of the rail section 7 to be cleared and is connected to the weight via the cable pull. For better understanding, there are transport means 5 in the rail section 7 in the situation shown. For autonomous operation of the clearing arrangement 6, the weight is secured by means of an electromagnet. A possible time sequence for clearing can be as follows, whereby it is clear to the skilled person that the sequence does not necessarily have to correspond to that described and that optional steps are included.

FIGS. 1 to 3 show that if the rail section 7 is to be cleared of transportation means 5, the electromagnet 39 is switched off and the weight 27 is thus released. The weight 27 then exerts a pulling force on the blade 10 with its weight force via the cable pull 26. The blade 10 is thus pivoted about the pivot axis S and the safety finger 16 of the blade 10 releases the retaining element 15 of the tilting device 13 after partial pivoting. After the release of the retaining element 15, the parallelogram of the tilting device 13 is displaced parallel by the pre-tensioned spring element 14, and the base 12 is tilted or inclined about the tilting axis K. This results in a superimposition of the swivel movement with the tilting movement of the blade 10, particularly in the second part of the swivel movement of the blade 10. The tilting of the tilting device 13 separates the stop element 17 arranged on the upper part 33 from the stop 18. The clearing device 8 is now in the clearing position, with the edge 22 of the blade 10 engaging with the holding means 25 of the transport means 5. As the stop element 17 is released from the stop 18, the clearing device 8 is moved along the rail section 7 against the conveying direction X by the weight 27 via the cable pull 26, as can be seen in FIGS. 5 and 6. Due to the relative movement of the blade 10, the holding means 25, or the clothes hangers 5 of the embodiments shown, are lifted from the edge 22 in a superimposed movement and moved sideways away from the hangers 4 and thus released. The hangers 5 released by the blade 10 are collected in the collecting section 21 of the blade 10 and conveyed out of the sliding section 7.

The words used in the description are descriptive rather than limiting, and it will be understood that various modifications may be made without departing from the scope of the disclosure.

The invention claimed is:

1. A suspended conveyor (1) comprising:
a rail (2) and a conveying means (3) which is movably mounted in a conveying direction (x) on the rail (2) and comprises carriers (4) for releasably holding suspended transport means (5); and
a clearing arrangement (6) for clearing at least one section (7) of the rail (2) of transport means (5), the clearing arrangement (6) comprising a clearing device (8) with a clearing element (10) which can be brought into engagement with the transport means (5) arranged on the rail (2), and
an actuating arrangement (11) which is designed to move the clearing device (8) from a standby state into a clearing state, wherein the transport means (5) can be released from the carriers (4) in the rail section (7) by the clearing element (10) in the clearing state by a relative movement of the clearing device (8) to the conveying means (3), wherein the clearing device (8) comprises a guide bearing (9) by means of which the clearing device (8) is movably arranged on the rail (2) and, in the clearing device state, is movable along the section (7) of the rail (2) by means of the actuating arrangement (11), along a rail segment (29).

2. The suspended conveyor (1) according to claim 1, wherein the clearing element (10) is adapted to carry the transport means (5) released from the carrier (4) in the clearing state.

3. The suspended conveyor (1) according to claim 2, wherein the guide bearing (9) forms an abutment for the clearing element (10) in the clearing state, so that rotation of the clearing element (10) about an axis parallel to the conveying direction (X) is minimized.

4. The suspended conveyor (1) according to claim 1, wherein the clearing element (10) is arranged on a base (12) of the clearing device (8) so as to be pivotable about a pivot axis (S) between a standby position and a clearing position.

5. The suspended conveyor (1) according claim 4, wherein the tilting device (13) has at least one spring element (14) which is pre-tensioned in the standby position and locked by a retaining element (15), wherein the retaining element (15) is secured by a securing finger (16) of the clearing element (10), so that the securing finger (16) releases the retaining element (15) by pivoting the clearing element (10) and the pre-tensioned spring element (14) moves or tilts the clearing element (10) from the standby position into the tilting position.

6. The suspended conveyor (1) according to claim 5, wherein the tilting device (13) is configured as a parallelogram and the at least one spring element (14) diagonally connects two corners of the parallelogram.

7. The suspended conveyor (1) according to claim 4, wherein a spring element (19) connects the clearing element (10) and the base (12), so that the clearing element (10) is pivotable from the standby position into the clearing position via a dead center and pivoting back is made more difficult.

8. The suspended conveyor (1) according to claim 1, wherein the clearing device (8) has a tilting device (13) which is arranged between the guide bearing (9) and the clearing device element (10) and is set up for this purpose, to move the clearing element (10) relative to the guide bearing (9) about a tilting axis (K) from a standby position to a tilting position, and in particular to tilt the base (12) about the tilting axis (K) when the clearing device (8) is moved from the standby state to the clearing state.

9. The suspended conveyor (1) according to claim 8, wherein a stop element (17) is arranged on the tilting device (13), which in the standby position abuts against a stop (18) fixed in relation to the rail section (7) in order to hold the clearing device (8) in a starting position and to release the movement of the clearing device (8) along the rail section (7) in the tilting position.

10. The suspended conveyor (1) according to claim 1, wherein the clearing element comprises a blade (10) with a release section (20) and a collecting section (21) adjacent thereto.

11. The suspended conveyor (1) according to claim 10, wherein the release section (20) has a contact contour, in particular an edge (22), which is aligned in the removal position of the blade (10) in such a way that it forms a slope towards the collecting section (21) for lifting the transport means (5) from the carriers (4) and/or that it forms an incline towards the collecting section (21) for moving the transport means (5) laterally away from the carriers (4), wherein the incline and the slope are preferably aligned in such a way that lifting and moving away of the transport means (5) from the carriers (4) take place in a superimposed movement.

12. The suspended conveyor (1) according to claim 10, wherein the collecting section (21) is formed as an indentation (23), the distal end of which is formed by one of a stop and a nose (24).

13. The suspended conveyor (1) according to claim 1, wherein the transport means (5) have hook-shaped holding means (25), and the transport means (5) are configured as clothes hangers and/or transport pockets.

14. The suspended conveyor (1) according to claim 1, wherein the clearing element (10) is arranged on a base (12) of the clearing device (8) so as to be pivotable about a pivot axis (S) between a standby position and a clearing position and wherein the clearing device (8) has a tilting device (13) which is arranged between the guide bearing (9) and the clearing device element (10) and is set up for this purpose, to move the clearing element (10) relative to the guide bearing (9) about a tilting axis (K), wherein the pivot axis (S) and the tilting axis (K) are arranged substantially perpendicular to each other and/or the pivot axis (S) and the tilting axis (K) are each arranged substantially perpendicular to the conveying direction (x).

15. The suspended conveyor (1) according to claim 1, wherein the conveying means (3) is a continuous recirculating conveying means.

16. The suspended conveyor (1) according to claim 1, wherein the actuating arrangement (11) has a cable pull (26) which connects the clearing element (10) to a secured weight (27), wherein the weight (27) is designed to exert a pulling force on the clearing element (10) after release by means of the cable pull (26).

17. A method for clearing a rail (2) of a suspended conveyor (1) region by region, comprising the following steps:
providing a suspended conveyor (1) comprising a rail (2) and a conveying means (3) which is movably mounted on the rail (2) in a conveying direction (x) and comprises carriers (4) for releasable holding suspended transport means (5);

providing a clearing arrangement (6) along a section (7) of the rail (2), which comprises a clearing device (8) with a clearing element (10), as well as an actuating arrangement (11) which is configured to move the clearing device (8) from a standby state to a clearing state, wherein the clearing device (8) comprises a guide bearing (9), by which the clearing device (8) is movably arranged on the rail section (7) and is moved along the rail section in the clearing device state by the actuating arrangement (11), along a rail segment (29); and bringing the clearing element (10) into engagement with the transport means (5) and transferring the clearing element (10) into a clearing state by a relative movement of the clearing device (8) to the conveying means (3), whereby the transport means (5) are released from the carriers (4) in the rail section (7).

18. The method according to claim 17, wherein the clearing element (10) is arranged on a base (12) of the clearing device (8) so as to be pivotable about a pivot axis (S) between a standby position and a clearing position and the clearing device (8) has a tilting device (13) and the clearing element (10) is moved in the clearing position relative to the guide bearing (9) about a tilting axis (K) from a standby position into a tilting position.

19. The method according to claim 18, wherein the tilting device (13) has at least one spring element (14) which is pre-stressed in the standby position and locked by a retaining element (15), wherein the retaining element (15) releases the pre-stressed spring element (14) in the clearing state and the clearing element (10) is moved from the standby position into the tilting position by the spring element (14).

20. The method according to claim 19, wherein a stop element (17) is arranged on the tilting device (13), which in the standby position rests against a stop (18) fixed in relation to the rail section (7) and holds the clearing device (8) in a start position and releases the movement of the clearing device (8) in the clearing device state.

* * * * *